United States Patent
Risser et al.

(10) Patent No.: US 11,008,172 B2
(45) Date of Patent: May 18, 2021

(54) CORNER UNIT FOR MATERIAL CONVEYING SYSTEM

(71) Applicant: Valco Industries, Inc., New Holland, PA (US)

(72) Inventors: Philip E. Risser, Leola, PA (US);
Logan Auker, Ephrata, PA (US);
Benajmin Carvell, Middletown, PA (US)

(73) Assignee: VALCO INDUSTRIES, INC., New Holland, PA (US)

( * ) Notice: Subject to any disclaimer, the term of this patent is extended or adjusted under 35 U.S.C. 154(b) by 0 days.

(21) Appl. No.: 16/840,504

(22) Filed: Apr. 6, 2020

(65) Prior Publication Data
US 2021/0070550 A1   Mar. 11, 2021

Related U.S. Application Data

(60) Provisional application No. 62/898,063, filed on Sep. 10, 2019.

(51) Int. Cl.
*B65G 17/38* (2006.01)
*B65G 19/14* (2006.01)
*A01K 39/01* (2006.01)

(52) U.S. Cl.
CPC ............ *B65G 17/38* (2013.01); *B65G 19/14* (2013.01); *A01K 39/01* (2013.01)

(58) Field of Classification Search
CPC ........ B65G 19/04; B65G 19/06; B65G 19/08; B65G 19/10; B65G 19/12; B65G 19/14; B65G 19/16; B65G 19/22; B65G 17/38; A01K 39/01; A01K 5/0208
See application file for complete search history.

(56) References Cited

U.S. PATENT DOCUMENTS

| | | | | |
|---|---|---|---|---|
| 3,003,464 A | * | 10/1961 | Bailey | A01K 39/01 119/57.2 |
| 8,245,837 B2 | * | 8/2012 | Eversole | B65G 23/04 198/642 |
| 8,418,837 B2 | * | 4/2013 | Eversole | B65G 19/14 198/642 |
| 10,611,576 B2 | * | 4/2020 | Herring, II | B65G 19/14 |

* cited by examiner

*Primary Examiner* — William R Harp
(74) *Attorney, Agent, or Firm* — Duane Morris LLP

(57) ABSTRACT

A corner unit for a feed conveying system includes a housing and a wheel. The housing defines a cavity and a track. The track is configured to receive a material conveying string. The wheel is disposed at least partially within the cavity of the housing and is configured to rotate within the cavity. The housing includes a plurality of ridges protruding into the cavity. The wheel includes a central hub, an outer rim, and one or more spokes extending from a first end coupled to the central hub to a second end coupled to the outer rim. At least one of the one or more spokes is swept such that, when the wheel is rotated in a first direction, the second end trails the first end such that rotation of the wheel in the first direction sweeps material that enters the cavity from the cavity and into the track.

21 Claims, 9 Drawing Sheets

CORNER UNIT FOR MATERIAL CONVEYING SYSTEM

CROSS-REFERENCE TO RELATED APPLICATIONS

This application claims priority to U.S. Provisional Patent Application No. 62/898,063, filed Sep. 10, 2019, the entirety of which is hereby incorporated herein by reference.

BACKGROUND

A chain disk system is a material conveying system commonly used to distribute material from a loading point to one or more unloading points. A typical use of such a system is to distribute feed throughout a swine housing facility. Other names used for such systems include tubular drag, chain and puck, and drag chain conveyor. Such systems can include tubing, a link chain with over-molded plastic disks, corner units, a material entrance hopper, and a drive unit. The chain is typically a loop that is connected end to end. Material enters the system through a hopper and is moved inside the tubes by disks connected to the chain. The chain can traverse corners via the corner units that typically include a wheel that rotates to carry the tension load of the chain. The material exits the system by dropping out of holes in the tube. The chain is driven by a rotating sprocket inside the drive unit. In some implementations, the tubing and corner units are configured such that each section of tubing is generally horizontal. In other implementations, the tubing and corner units can be configured in such a way that one or more sections of tubing are oriented vertically.

FIG. 1A shows a typical corner unit 10. The corner unit 10 includes a housing 12, an axle 14, and a wheel 16 configured to guide a chain disk 18. As shown in FIG. 1B, the chain disk includes a plurality of disks 18b coupled in series by chain links 18a. The chain disk 18 is configured into a long loop within the chain disk system and moves the feed through the chain disk system and guides the feed through the corner unit 10. In prior art corner units, as the chain disk 18 rotates around the wheel 16, the feed material can spill into the wheel cavity 20 of the corner unit's housing 12. This feed is thereby removed from the feed material flow. The feed in the wheel cavity 20 typically gets trapped inside the cavity 20 until the corner unit 10 is taken apart and cleaned. If not removed frequently, the trapped feed can grow mold, thereby creating a risk to the biosecurity of the facility (e.g., a swine farm). The feed trapped inside the cavity 20 can also inhibit the rotation of the wheel 16 and cause excessive wear and load on the chain disk system. The extent and rate of feed buildup inside the cavity 20 can vary depending on the orientation of the corner unit. For example, in implementations in which corner units are oriented vertically, as shown in FIG. 3, corner units in the positions of corner units 112-1 and 112-2 may be particularly susceptible to entrapped material.

SUMMARY

In one aspect, a corner unit for a feed conveying system includes a housing and a wheel. The housing defines a cavity and a track. The track is configured to receive a material conveying string. The housing includes a plurality of ridges protruding into the cavity and extending from a center of the cavity toward an outside of the cavity. The wheel is disposed at least partially within the cavity of the housing and is configured to rotate within the cavity. The wheel includes a central hub, an outer rim, and one or more spokes extending from a first end coupled to the central hub to a second end coupled to the outer rim. At least one of the one or more spokes is swept such that, when the wheel is rotated in a first direction, the second end trails the first end such that rotation of the wheel sweeps material that enters the cavity from the cavity and into the track.

In another aspect, a corner unit for a feed conveying system includes a housing and a wheel. The housing defines a cavity and a track. The track is configured to receive a material conveying string. The housing includes a plurality of ridges protruding into the cavity and extending from a center of the cavity toward an outside of the cavity. The wheel is at least partially disposed within the cavity and is configured to rotate within the cavity. Rotation of the wheel causes material that enters the cavity to pass over the plurality of ridges protruding into the cavity and causes the material to flow out of the cavity and into the track.

In another aspect, a feed conveying system includes a first section of tubing, a second section of tubing, and a corner unit coupled to the first section of tubing and the second section of tubing. The corner unit includes a housing and a wheel. The housing defines a cavity and a track. The track is configured to receive a material conveying string that extends through the first section of tubing and the second section of tubing. The housing includes a plurality of ridges protruding into the cavity and extending from a center of the cavity toward an outside of the cavity. The wheel is disposed at least partially within the cavity of the housing and is configured to rotate within the cavity. The wheel includes a central hub, an outer rim, and one or more spokes extending from a first end coupled to the central hub to a second end coupled to the outer rim. At least one of the one or more spokes is swept such that, when the wheel is rotated in a first direction, the second end trails the first end such that rotation of the wheel sweeps material that enters the cavity from the cavity and into the track.

BRIEF DESCRIPTION OF THE DRAWINGS

The features of the embodiments described herein will be more fully disclosed in the following detailed description, which is to be considered together with the accompanying drawings wherein like numbers refer to like parts.

FIG. 4 shows a first exploded view of a corner unit, according to one embodiment described herein, where the viewing angle shows the inside structures of the first housing component 118a.

FIG. 9 shows a detail view of a rotation direction indicator.

DETAILED DESCRIPTION

Figure 1A:
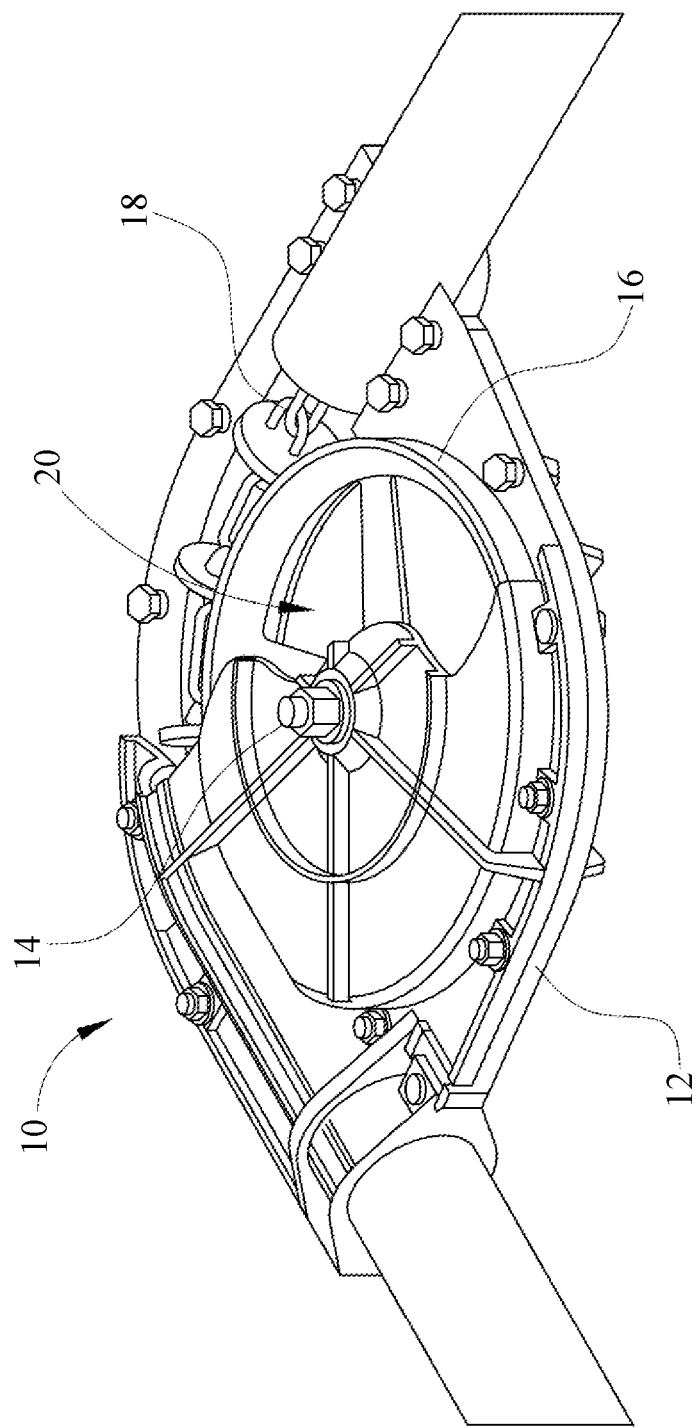
FIG. 1A shows a perspective view of a prior art corner unit, with the housing partially cut away to show the chain disk and the wheel.

This description of the exemplary embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Described herein is an improved corner unit for a chain disk system that is configured to prevent the build-up of feed or other materials in the corner unit by continuously expelling material that enters the housing of the corner unit. Such corner units can include various features that force the material out of the housing as the wheel of the corner unit rotates. These features can include raised ridges in the housing cavity, swept spokes on the wheel, openings extending through the outer rim of the wheel, and a sweeper that rotates with the wheel. Although described in relation to agricultural feed systems, the corner units described herein are not limited to such applications. The corner units may be appropriate for any system configured to transport material with a chain disk or other similar technology.

Figure 2:
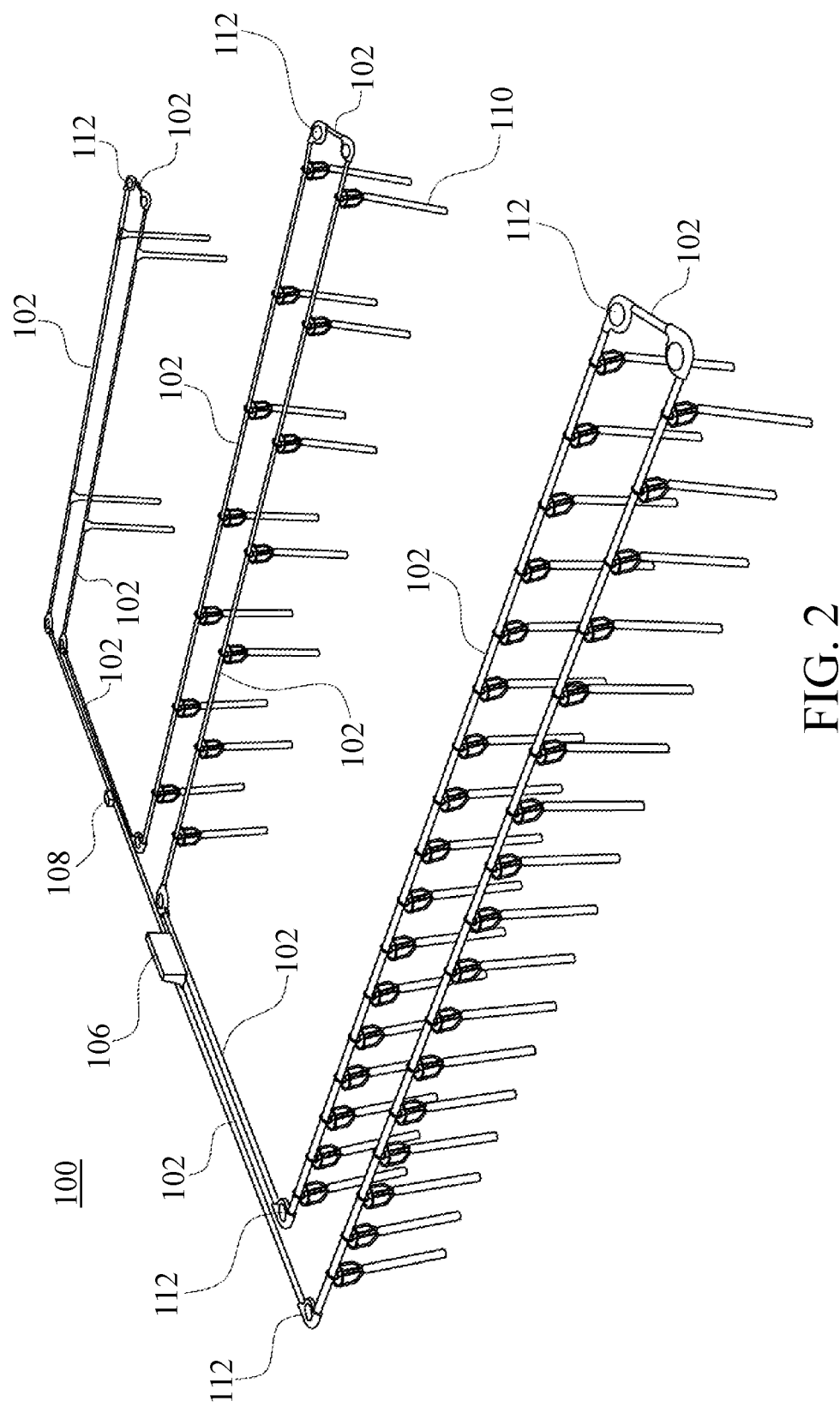
FIG. 2 shows a perspective view of a material conveying system, according to one embodiment described herein.
Figure 3:
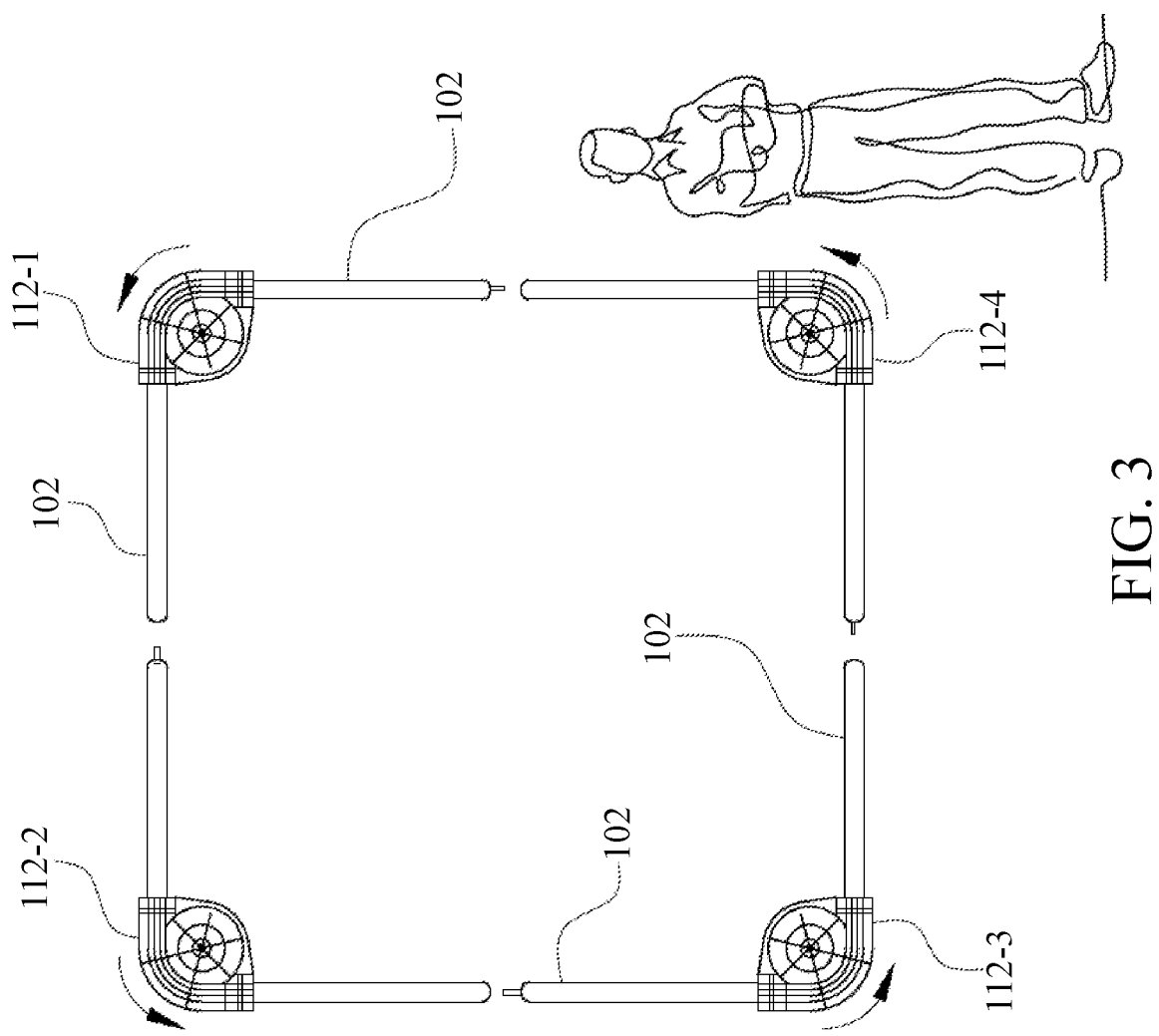
FIG. 3 illustrates various orientations for a corner unit in a material conveying system.

FIG. 2 shows a material conveying system 100. The material conveying system 100 includes a plurality of sections of tubing 102, a material conveying string 104 (shown in FIG. 6) disposed in the sections of tubing 102, a drive unit 106, a material entrance hopper 108, a plurality of material dropouts 110, and a plurality of the inventive corner units 112 coupling the sections of tubing 102. As shown in FIG. 2, in some applications, the sections of tubing 102 can be positioned substantially horizontally. As shown in FIG. 3, some portions of the tubing 102 can be positioned vertically. In such implementations, the corner units 112 can be oriented in any of four orientations. Specifically, corner units 112-1 and 112-2 are positioned such that the wheel and cavity of the respective corner unit are below a horizontal portion of tubing 102 to which the corner unit 112-1, 112-2 is connected. Corner units 112-3 and 112-4 are positioned such that the wheel and cavity of the respective corner unit is above a horizontal portion of tubing 102 to which it is connected. As noted above, the orientation of the corner unit 112 is a factor in the likelihood of feed accumulation in the corner unit 112.

The sections of tubing 102 can be constructed of any appropriate material. For example, in some embodiments, the sections of tubing 102 are constructed from polyvinyl chloride (PVC).

Figure 1B:
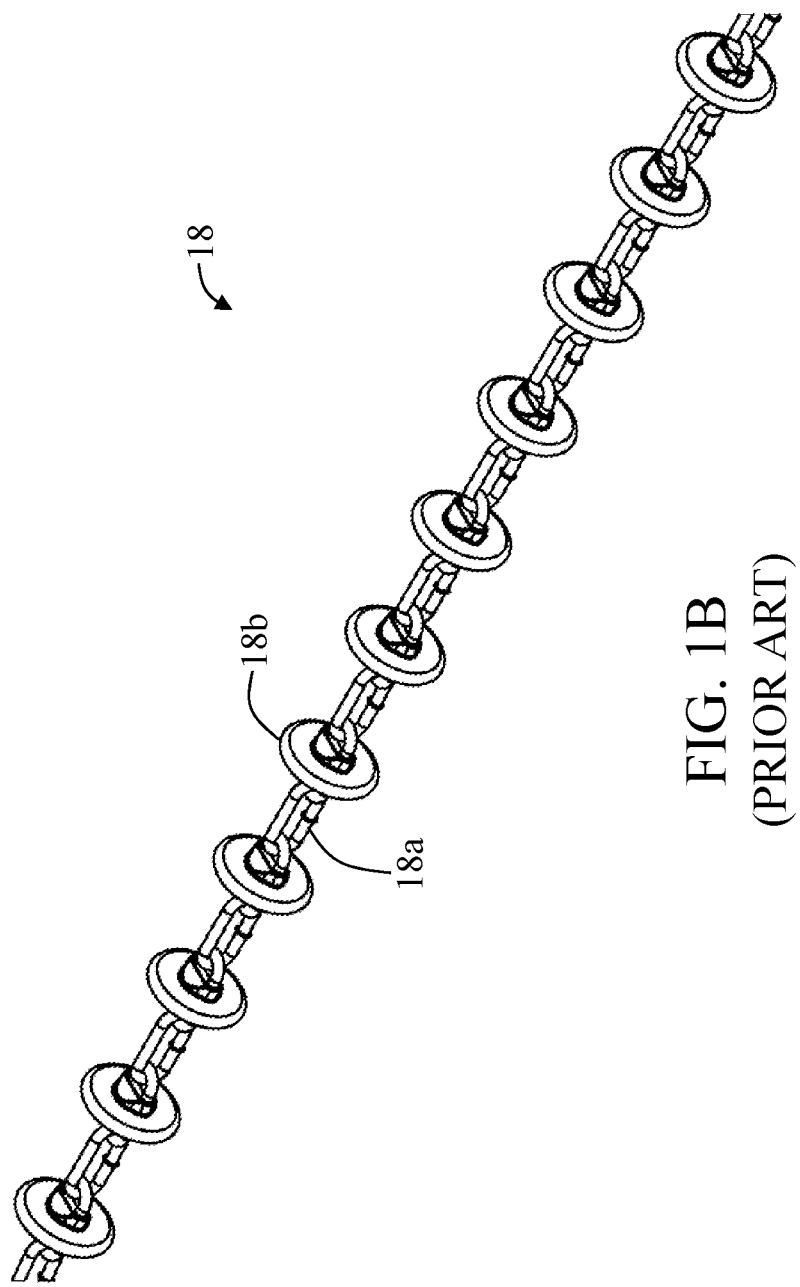
FIG. 1B shows a perspective view of a chain disk.

The material conveying string 104 can be any elongate member capable of conveying material through the sections of tubing 102. For example, the material conveying string 104 can be a chain disk 18, as shown in FIGS. 1A and 1B. In other embodiments, the material conveying string can be, for example, a cable and disk or a rope and disk.

The drive unit 106 can include a drive motor, gearbox, and disk drive. The disk drive can be configured to engage the material conveying string 104 to drive the material conveying string through the sections of tubing 102. In embodiments in which the material conveying string 104 is a chain disk, the chain disk includes a chain 18a with a plurality of disks 18b spaced along the chain (as shown in FIG. 1B). As the material conveying string 104 moves through the sections of tubing 102, the disks 18b push a quantity of the feed through the system of tubing 102. Thus, preferably, the outer diameter of the disks 18b can be substantially the same as, or slightly smaller than, the inner diameter of the sections of tubing 102 so that the chain disks can move through the system of tubing 102 with minimal encumbrances but without having too much of the feed leaking between the disks and the tubing 102.

The material entrance hopper 108 is configured to allow material—such as feed—to be loaded into the tubing 102. For example, the hopper 108 may be a tapered container with an open bottom to discharge material into the tubing 102.

The material dropouts 110 couple to the tubing 102 to convey material downward so that it can be accessed by swine or other livestock. In some embodiments, one or more of the material dropouts 110 can be closed or restricted to prevent feed from entering the respective dropout 110.

Figure 4:
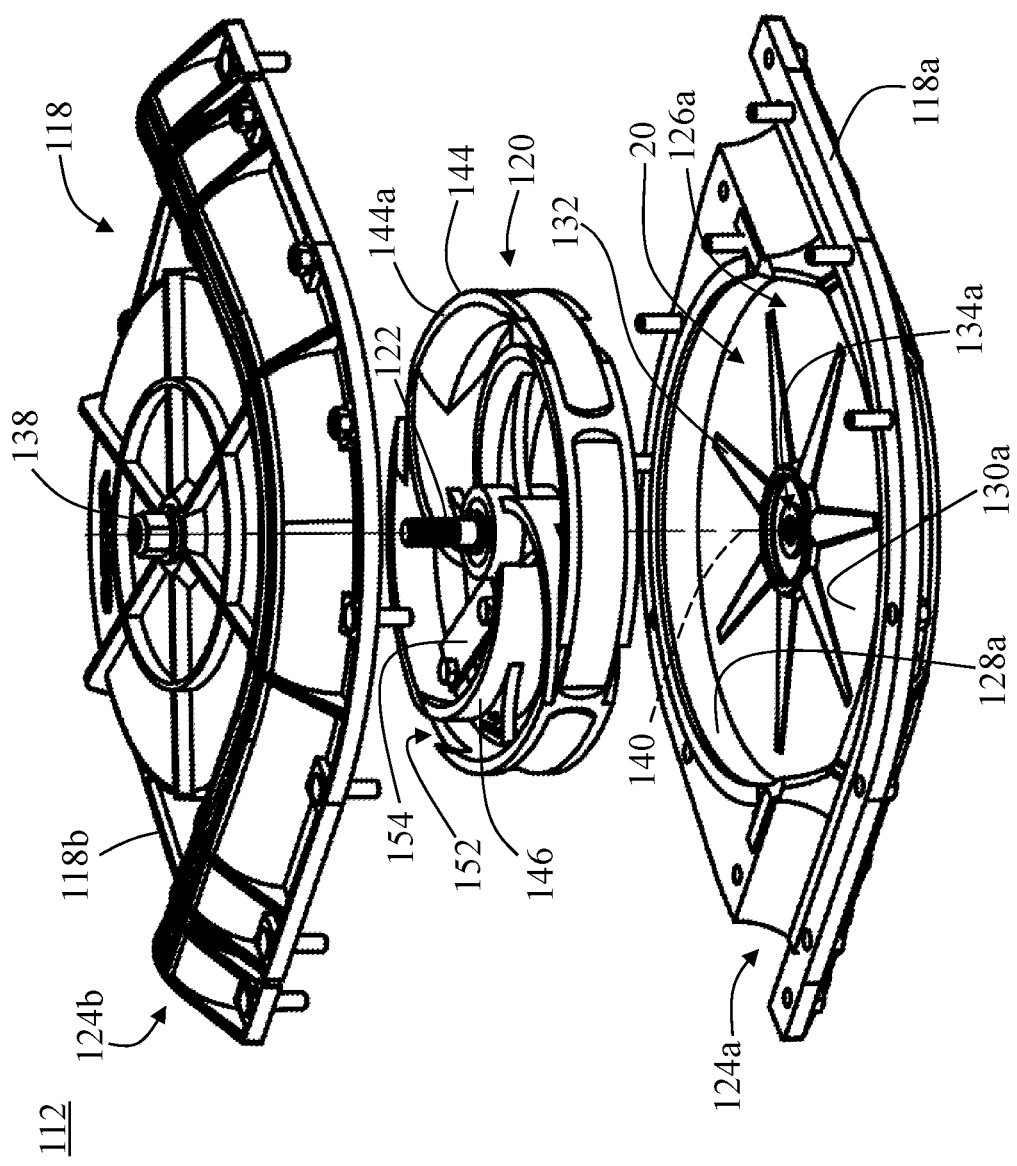
Figure 5:
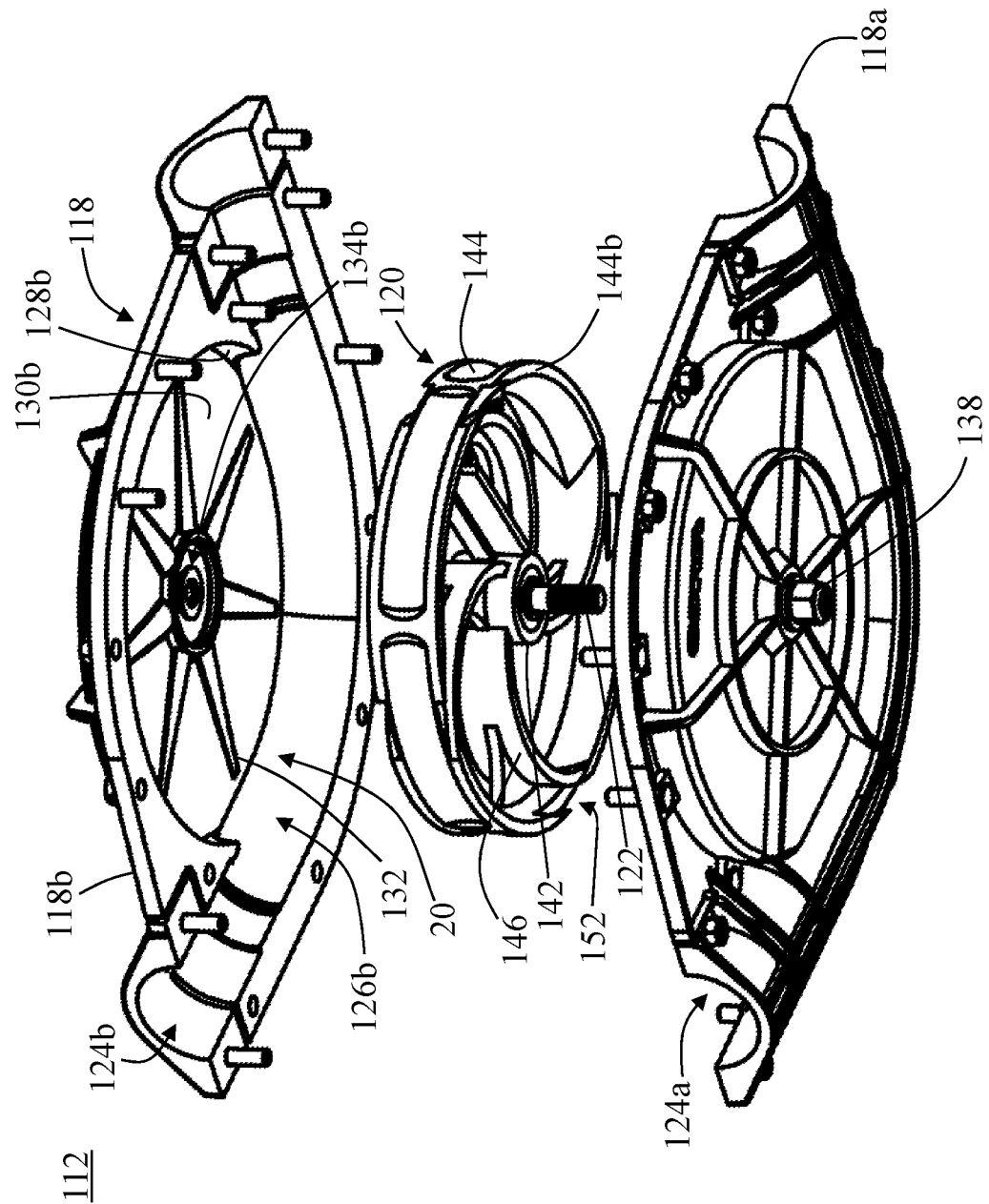
FIG. 5 shows a second exploded view of the corner unit of FIG. 4, where the viewing angle shows the inside structures of the second housing component 118b.

FIGS. 4 and 5 show exploded views of a corner unit 112. The corner unit 112 includes a housing 118 including a first housing component 118a and a second housing component 118b. In some embodiments, the first 118a and second 118b housing components are substantially identical. The corner unit 112 further includes a wheel 120 coupled to an axle 122 that allows rotation of the wheel 120 relative to the housing 118. For example, the wheel 120 can be coupled to the axle 122 using a bearing or other component that allows rotation of the wheel 120 around the axle 122.

Figure 6:
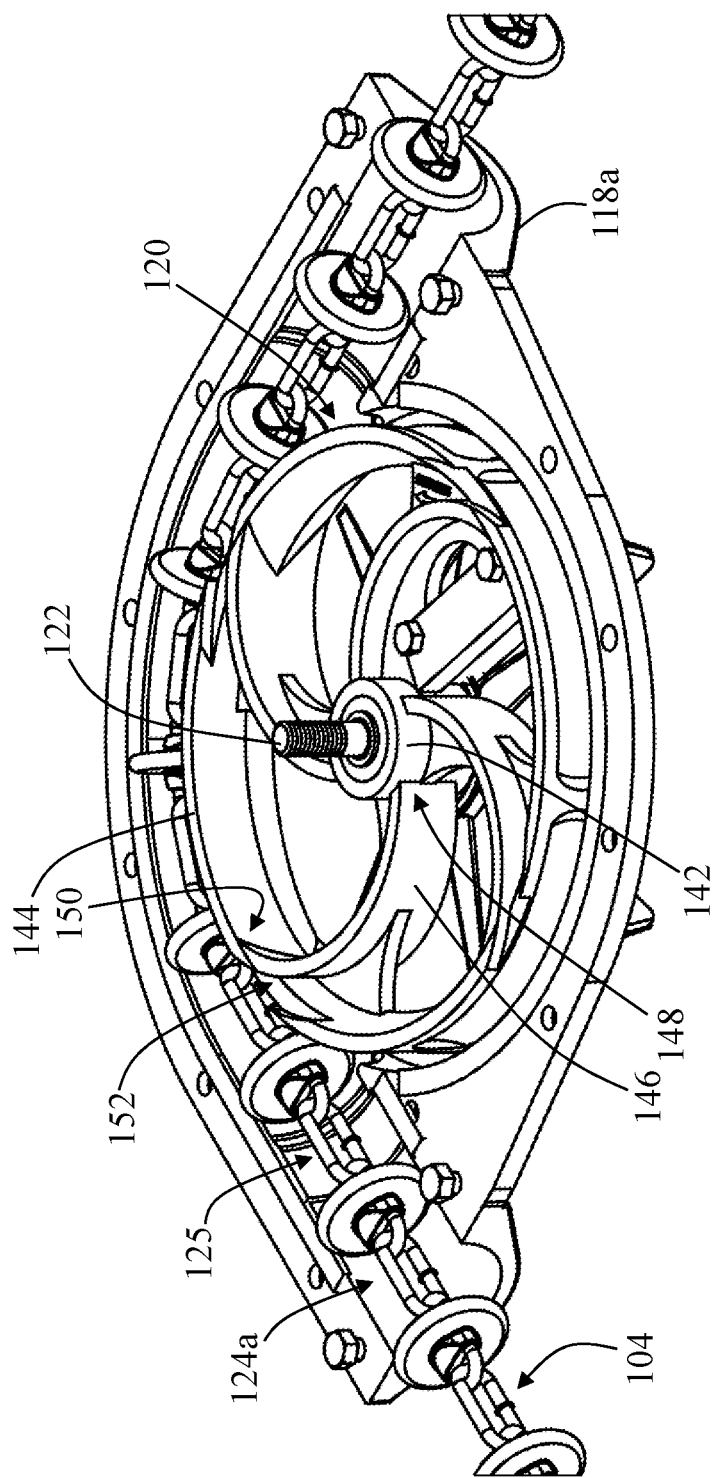
FIG. 6 shows a perspective view of the bottom portion of the housing and the wheel of the corner unit of FIG. 4 with a chain disk disposed in the corner unit.

The first housing component 118a includes a first passage 124a and the second housing component 118b includes a second passage 124b. When the first 118a and second 118b housing components are assembled together, the first passage 124a and the second passage 124b together define a track or a passageway 125 (shown in FIGS. 6-8) that is configured to guide the material conveying string 104, as shown in FIG. 6. The material conveying string 104 contacts the wheel 120 such that translation of the material conveying string within the track 125 rotates the wheel 120.

The first housing component 118a further includes a first recess 126a and the second housing component 118b includes a corresponding second recess (126b). When assembled, the first recess 126a and the second recess 126b (shown in FIG. 5) together define the wheel cavity 20 (shown in FIG. 7) configured to receive the wheel 120. Each recess includes a sidewall (e.g., sidewall 128a, 128b) surrounding a portion of a base (e.g., base 130a, 130b). The sidewall encompasses only a portion of the recess such that a portion of the wheel 120 is exposed to the track 125 (e.g., first passage 124a) to allow the material conveying string 104 to contact the wheel 120 and cause rotation of the wheel 120 when the material conveying string 104 is traversing through the track 125.

Figure 7:
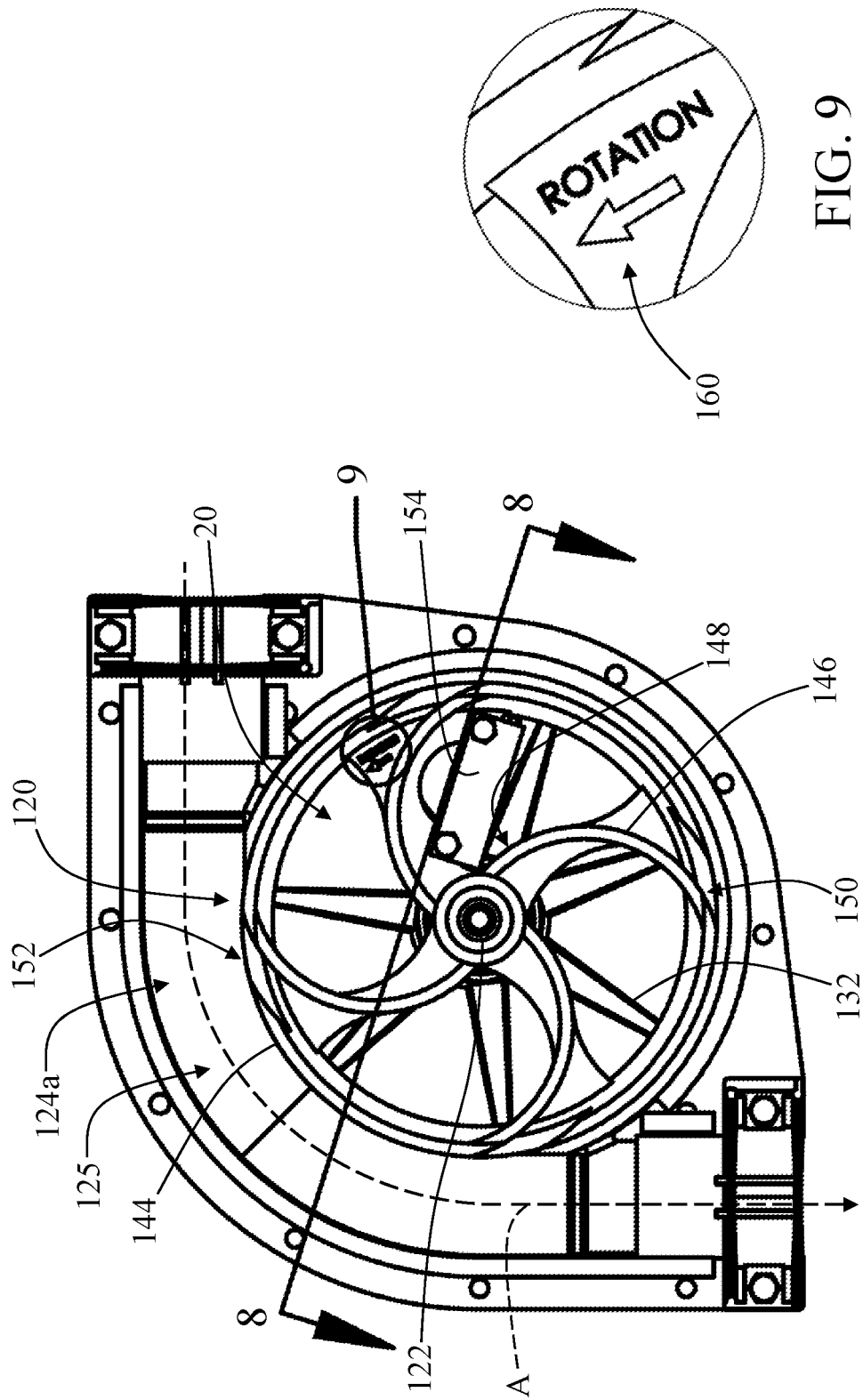
FIG. 7 shows a top view of the bottom portion of the housing and the wheel of the corner unit of FIG. 4.
Figure 8:
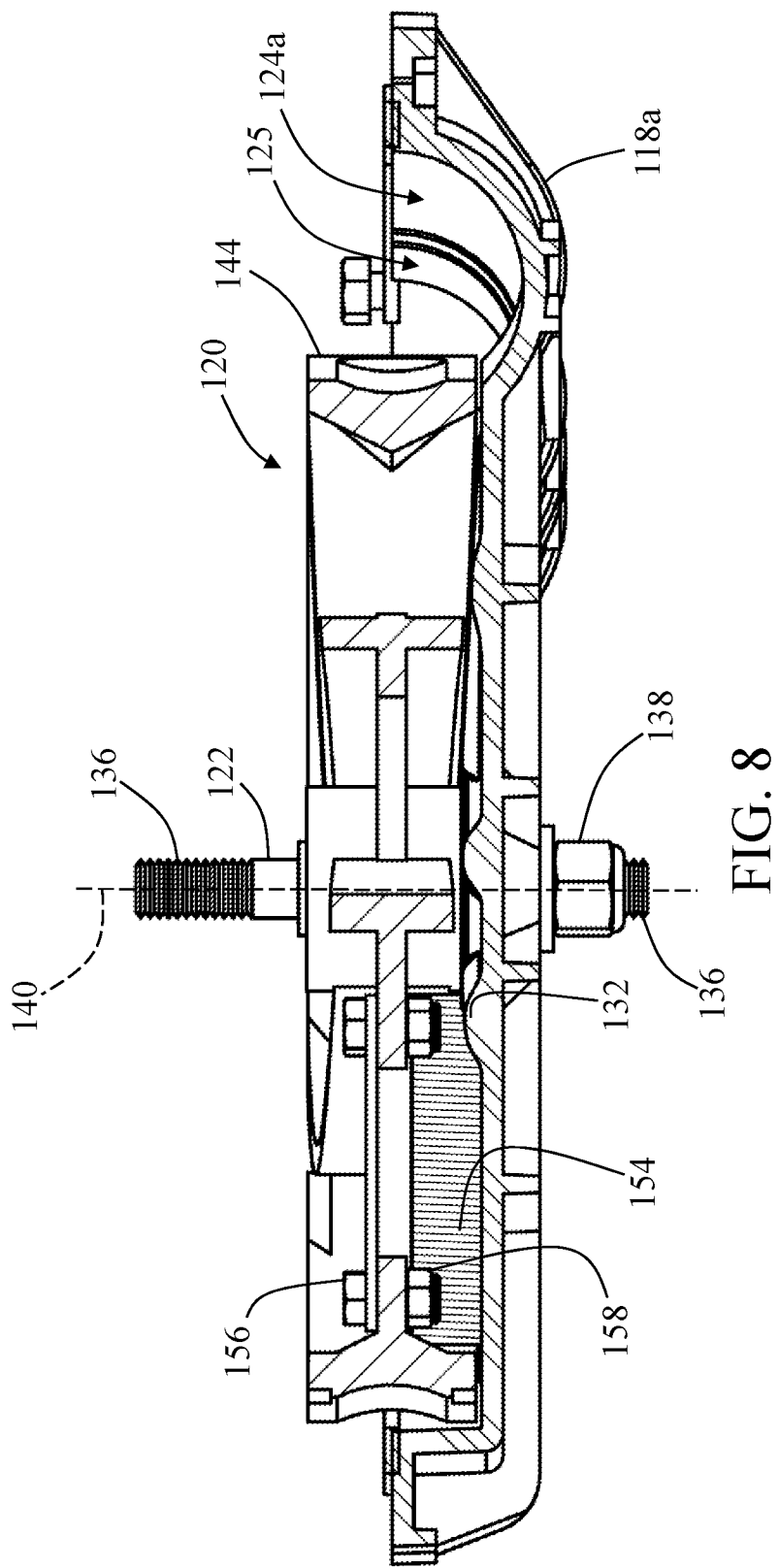
FIG. 8 shows a cross-sectional view of the bottom portion of the housing and the wheel taken along section line 8-8 in FIG. 7.

As shown in FIGS. 4, 5, and 7 and the cross-sectional view of FIG. 8, the inside surfaces of the first and second housing components 118a, 118b include a plurality of raised ridges 132 extending upward from the respective base 130a, 130b. When the wheel 120 rotates in the cavity 20, the ridges 132 disturb and agitate the feed that falls into the cavity 20 and prevent the feed from resting on the respective base 130a, 130b. This allows the feed to be swept out of the cavity 20 and back into the track 125 where it can be pulled through the tubing 102 by the material conveying string 104. As shown in FIGS. 4 and 5, for example, in various embodiments, the ridges 132 extend radially from the center of the respective recess 126a, 126b toward the outside of the recess 126a, 126b. In other embodiments (not shown), the ridges 132 can be swept forward or backward relative to a radial orientation. For example, the ridges 132 can be curved as are the spokes 146 (as described below) or the spokes 146 can be aligned with a non-radial chord of the respective recess 126a, 126b. The ridges 132 can be any appropriate height. For example, in one embodiment, the ridges 132 have a height of 0.17 inches. In other embodiments, the ridges 132 have a height of between 0.03 inches and 0.25 inches. Each of the housing components 118a, 118b can include any number of ridges 132. For example, in one embodiment, each of the housing components 118a, 118b includes seven ridges 132. In some embodiments, only one of the housing components 118a, 118b includes raised ridges. The ridges 132 can be rigid or, alternatively, can be flexible or movable agitator features. For example, the ridges 132 can be constructed of a relatively flexible material that allows the ridges 132 to flex in response to movement of the wheel 120.

Each of the housing components 118a, 118b can further include a center aperture 134a, 134b through which the axle 122 extends when the corner unit 112 is assembled. As shown in FIG. 8, in some embodiments, the axle 122 includes threaded ends 136. When assembled, a nut 138, or other fastener can be coupled to the threaded end 136 of the axle 122 to couple the axle 122, and the wheel 120, to the housing 118. It should be understood that, although FIG. 8 shows only the coupling of the axle 122 to the first housing component 118a, a similar engagement can be made with the second housing component 118b, for example using the nut 138 shown in FIG. 4.

The wheel 120 is configured to be disposed in the cavity 20 defined by the first 118a and second 118b housing components. The wheel 120 is coupled to the axle 122 to allow for rotation of the wheel 120 about a rotation axis 140 (shown in FIGS. 4 and 8). The wheel 120 includes a central hub 142 coupled to the axle 122, an outer rim 144, and a plurality of spokes 146 extending from their first ends 148 coupled to the hub 142 to their second ends 150 coupled to the outer rim 144.

As shown in FIGS. 4-7, the spokes 146 are swept such that, when the wheel 120 rotates, the first ends 148 of the spokes 146 closer to the hub 142 lead their respective second ends 150. As shown in FIG. 7, and in detail in FIG. 9, the corner unit 112 can include a rotation direction indicator 160 indicating the proper direction of the rotation of the wheel 120. The rotation direction indicator 160 can be on the wheel 120 such that it can be viewed through one or both of the housing components 118a, 118b. The rotation direction of the wheel 120 should match the direction of the flow of the feed in the track 125 when installed in a chain disk system, illustrated by the dashed line 'A' in FIG. 7. The swept orientation of the spokes 146 causes the feed in the cavity 20 to be swept into the track 125 as the wheel 120 turns. In some embodiments, the spokes 146 are curved. In some embodiments, the radius of curvature of the spokes 146 is constant from the first end 148 to the second end 150. In other embodiments, the radius of curvature of the spokes 146 varies from the first end 148 to the second end 150. For example, the radius of curvature of the spokes 146 may be smaller or tighter nearer the first end 148 than at the second end 150. The curvature of the spokes can further enhance the sweeping of the feed out of the track 125.

As shown best in FIGS. 4-7, the wheel 120 can include a plurality of openings 152 in the outer rim 144 for allowing the feed swept up by the spokes 146 to pass through the outer rim 144 and return to the track 125. The openings 152 can be formed by sections of the outer rim 144 having reduced height compared to other sections of the outer rim 144. In some embodiments, the wheel 120 includes openings 152 at the top 144a (shown in FIG. 4) and bottom 144b (shown in FIG. 5) of the outer rim 144. Preferably, the openings 152 can be located adjacent to the second end 150 of each of the spokes 146. The openings 152 allow feed to pass through the outer rim 144 and return to the track 125.

As shown best in FIG. 8, the corner unit 112 can further include at least one sweeper 154 coupled to the wheel 120. The sweeper 154 extends from the wheel 120 to contact the base of the recess (e.g., base 130a) of the first 118a and/or the second 118b housing component. As the wheel 120 rotates, the sweeper 154 rotates with the wheel 120 and assists in removing the trapped feed out of the cavity 20 by sweeping the cavity space as the wheel 120 rotates. In some embodiments, the sweeper 154 is angled relative to a radius of the wheel 120 such that feed is preferably guided toward the outer rim 144 and, in some embodiments, toward an opening 152. In other words, the sweeper 154 can be aligned along a chord that does not pass through the center of the wheel 120. The sweeping action of the sweeper 154 and the raised radial ridges 132 work together to disturb and agitate the feed trapped in the cavity 20 and assist the spokes 146 in pushing the trapped feed out of the cavity 20.

The sweeper 154 can be coupled to the wheel 120 in any appropriate manner. For example, in some embodiments, as shown in FIG. 8, the sweeper 154 is coupled to the wheel 120 using fasteners 156, such as bolts or screws, and nuts 158. The corner unit 112 can include any number of sweepers 154. For example, the corner unit 112 can include a single sweeper 154, as shown in FIG. 7. In other embodiments, the corner unit 112 includes multiple sweepers 154, with each sweeper 154 coupled to a different spoke 146. For example, the corner unit 112 can include a sweeper 154 coupled to each spoke 146.

In some embodiments, the sweeper 154 includes a brush having a plurality of bristles extending toward the base of the recess (e.g., base 130a). In other embodiments, the sweeper 154 includes a rubber blade (similar to a squeegee) contacting the base of the recess (e.g., base 130a).

In use, the features of the corner unit 112 prevent the feed material from becoming entrapped in the cavity 20 defined by the first 118a and second 118b housing components. When feed enters the cavity 20, rotation of the wheel 120 causes the feed to be tossed about inside the cavity 20. As it does so, the feed rides over the ridges 132 extending from the base (e.g., base 130a), thereby causing the feed particles to repeatedly move against each other. This movement prevents stagnation of the feed material, relative to the wheel. In addition, the swept spokes 146 and the openings 152 in the outer rim 144 of the wheel 120, cause the feed to be repeatedly forced to the outside of the wheel 120 and eventually exit the cavity 20 to return to the track 125 and be transported by the material conveying string 104. In this manner, feed inside the wheel cavity 20 exits the corner unit 112 and returns to the feed flow. The corner units described herein can clear feed from the cavity 20 no matter what orientation the corner unit 112 is in, including vertical (e.g., as shown in FIG. 3) and horizontal orientations (e.g., as shown in FIG. 2).

In some instances, such as in implementations in which a corner unit 112 is installed horizontally, a thin layer of feed may form between the raised ridges 132 within the cavity 20. This can occur when the material conveying system 100 is running but not conveying material. In embodiments in which the first 118a and/or second 118b housing components include the raised ridges 132 extending from the base 130, there can be a clearance between the wheel 120 and the base of the recess (e.g., base 130a), to allow space for the ridges 132. The sweeper 154 can be used in such embodiments to move the feed trapped in the cavity 20 and, in combination with the swept spokes 146, force the feed to the outside of the wheel 120 and into the track 125.

It will be understood that the foregoing description is of exemplary embodiments of this invention, and that the invention is not limited to the specific forms shown. Modifications may be made in the design and arrangement of the elements without departing from the scope of the invention.

What is claimed is:

1. A corner unit for a feed conveying system, the corner unit comprising:
   a housing defining a cavity and a track, wherein the track is configured to receive a material conveying string, and wherein the housing includes a plurality of ridges protruding into the cavity and extending from a center of the cavity toward an outside of the cavity; and
   a wheel disposed at least partially within the cavity of the housing and configured to rotate within the cavity, the wheel comprising:
      a central hub;
      an outer rim; and
      one or more spokes extending from a first end coupled to the central hub to a second end coupled to the outer rim, wherein at least one of the one or more spokes is swept such that, when the wheel is rotated in a first direction, the second end trails the first end such that rotation of the wheel sweeps material that enters the cavity to pass over the plurality of ridges and causes the material to flow from the cavity and into the track.

2. The corner unit of claim 1, wherein each of the one or more spokes is swept such that, when the wheel is rotated in the first direction, the second end of each respective spoke trails the first end of the respective spoke.

3. The corner unit of claim 1, wherein the housing comprises a first housing component and a second housing component wherein the cavity is defined between the first housing component and the second housing component, and each of the first housing component and the second housing component comprises some of the plurality of ridges protruding into the cavity.

4. The corner unit of claim 1, wherein each of the plurality of ridges extends radially from an end adjacent a center of the cavity toward an outside of the cavity.

5. The corner unit of claim 1, wherein each of the plurality of ridges is swept relative to a radius of the cavity.

6. The corner unit of claim 1, further comprising a sweeper coupled to the wheel, wherein the sweeper contacts a base of the cavity to sweep material from the cavity into the track.

7. The corner unit of claim 1, wherein at least one of the one or more spokes is curved from the first end to the second end.

8. The corner unit of claim 1, wherein at least one of the one or more spokes has a constant curvature from the first end to the second end.

9. The corner unit of claim 1, wherein the wheel defines an opening extending through the outer rim adjacent to the second end of one of the one or more spokes, the opening configured to allow material to pass from the cavity and into the track.

10. A corner unit for a feed conveying system, the corner unit comprising:
    a housing defining a cavity and a track, wherein the track is configured to receive a material conveying string, and wherein the housing includes a plurality of ridges protruding into the cavity and extending from a center of the cavity toward an outside of the cavity; and
    a wheel at least partially disposed within the cavity and configured to rotate within the cavity;
    wherein rotation of the wheel causes material that enters the cavity to pass over the plurality of ridges protruding into the cavity and causes the material to flow out of the cavity and into the track.

11. The corner unit of claim 10, wherein the housing comprises a first housing component and a second housing component, wherein the cavity is defined between the first housing component and the second housing component, and each of the first housing component and the second housing component comprises some of the plurality of ridges protruding into the cavity.

12. The corner unit of claim 10, wherein each of the plurality of ridges extends radially from the center of the cavity toward an outside of the cavity.

13. The corner unit of claim 10, wherein each of the plurality of ridges is swept relative to a radius of the cavity.

14. The corner unit of claim 10, further comprising a sweeper coupled to the wheel, wherein the sweeper contacts a base of the cavity to sweep material in the cavity into the track.

15. The corner unit of claim 10, wherein the wheel includes a central hub, an outer rim, and one or more spokes extending from a first end coupled to the central hub to a second end coupled to the outer rim, wherein at least one of the one or more spokes is curved from the first end to the second end.

16. The corner unit of claim 15, wherein at least one of the one or more spokes has a constant curvature from the first end to the second end.

17. The corner unit of claim 15, wherein the wheel defines an opening extending through the outer rim adjacent to the second end of one of the one or more spokes, the opening configured to allow material to pass from the cavity and into the track.

18. A feed conveying system, comprising:
    a first section of tubing;
    a second section of tubing; and
    a corner unit coupled to the first section of tubing and the second section of tubing, wherein the corner unit comprises:
       a housing defining a cavity and a track, wherein the track is configured to receive a material conveying string that extends through the first section of tubing and the second section of tubing, and wherein the housing includes a plurality of ridges protruding into the cavity and extending from a center of the cavity toward an outside of the cavity; and a wheel disposed at least partially within the cavity of the housing and configured to rotate within the cavity, the wheel comprising:

a central hub;

an outer rim; and one or more spokes extending from a first end coupled to the central hub to a second end coupled to the outer rim, wherein at least one of the one or more spokes is swept such that, when the wheel is rotated in a first direction, the second end trails the first end such that rotation of the wheel sweeps material that enters the cavity to pass over the plurality of ridges and causes the material to flow from the cavity and into the track.

19. The feed conveying system of claim 18, wherein the corner unit further comprises a sweeper coupled to the wheel, wherein the sweeper contacts a base of the cavity to sweep material from the cavity into the track.

20. The feed conveying system of claim 18, wherein at least one of the one or more spokes is curved from the first end to the second end.

21. The feed conveying system of claim 18, wherein the housing comprises a first housing component and a second housing component, wherein the cavity is defined between the first housing component and the second housing component, and each of the first housing component and the second housing component comprises some of the plurality of ridges protruding into the cavity.

* * * * *

UNITED STATES PATENT AND TRADEMARK OFFICE
CERTIFICATE OF CORRECTION

Page 1 of 1

PATENT NO. : 11,008,172 B2
APPLICATION NO. : 16/840504
DATED : May 18, 2021
INVENTOR(S) : Risser et al.

It is certified that error appears in the above-identified patent and that said Letters Patent is hereby corrected as shown below:

On the Title Page

Item "(72) Inventors", Line 3:
The first name of the third inventor delete "Benajmin" and insert --Benjamin--.

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*